(12) United States Patent
Simkowski

(10) Patent No.: US 6,382,399 B2
(45) Date of Patent: May 7, 2002

(54) ARTICLE CONVEYANCE HAVING MECHANICAL DRIVE

(75) Inventor: Donald J. Simkowski, Loveland, CO (US)

(73) Assignee: Goldco Industries, Inc., Loveland, CO (US)

(*) Notice: Subject to any disclaimer, the term of this patent is extended or adjusted under 35 U.S.C. 154(b) by 0 days.

(21) Appl. No.: 09/928,835

(22) Filed: Aug. 13, 2001

Related U.S. Application Data

(62) Division of application No. 09/419,342, filed on Oct. 15, 1999, now Pat. No. 6,279,729.

(51) Int. Cl.⁷ .................................................. B65G 15/14
(52) U.S. Cl. ............................... 198/626.1; 198/626.6
(58) Field of Search .......................... 198/604, 620, 198/626.1, 626.5, 626.6, 831, 817

(56) References Cited

U.S. PATENT DOCUMENTS

| | | | |
|---|---|---|---|
| 2,734,621 A | * | 2/1956 | Mojonnier ............... 198/626.6 |
| 3,122,234 A | | 2/1964 | Kagley |
| 3,289,867 A | | 12/1966 | Burke |
| 3,850,284 A | | 11/1974 | Roberts |
| 3,934,993 A | | 1/1976 | Bowman et al. |
| 4,114,347 A | | 9/1978 | Morris et al. |
| 4,284,370 A | | 8/1981 | Danler et al. |
| 4,479,574 A | | 10/1984 | Julius et al. |
| 4,556,143 A | | 12/1985 | Johnson |
| 4,802,571 A | | 2/1989 | Born et al. |
| 4,823,940 A | | 4/1989 | Cretser |
| 4,836,359 A | | 6/1989 | Walter |
| 4,840,268 A | | 6/1989 | Zemek |
| 4,874,081 A | | 10/1989 | Kondo |
| 5,029,696 A | * | 7/1991 | Van Tilburg ............. 198/626.1 |
| 5,038,919 A | | 8/1991 | Harston |
| 5,511,651 A | | 4/1996 | Barth |
| 5,553,698 A | | 9/1996 | Patois et al. |
| 5,630,679 A | | 5/1997 | Simkowski et al. |
| 5,871,325 A | | 2/1999 | Schmidt et al. |
| 5,937,998 A | | 8/1999 | Priero |
| 6,131,724 A | * | 10/2000 | Hirasawatu et al. . 198/626.1 X |
| 6,274,729 B1 | * | 8/2001 | Simkowski ............. 198/626.1 |

* cited by examiner

Primary Examiner—James R. Bidwell
(74) Attorney, Agent, or Firm—Robert E. Harris

(57) ABSTRACT

Apparatus and method for conveying articles, particularly articles such as containers, or bottles, having a neck portion with a neck ring thereon, along an article conveying path with the articles being urged along the article conveying path by article engaging members extending from a plurality of sections of an elongated movable member that extends from a guide along a guide path adjacent and horizontally offset from the article conveying path. The elongated movable member is preferably a chain having a plurality of links and article engagement preferably includes a flange that extends horizontally from each chain link into the article conveying path with adjacent flanges spaced from one another in the article conveying path whereby the chain links and flanges extending therefrom enable limited angular deviation of the chain during normal operation with the flanges engaging the lower edge of the neck ring of articles in the article conveying path so that the articles are urged along the article conveying path upon movement of the chain unit along the guide path.

10 Claims, 3 Drawing Sheets

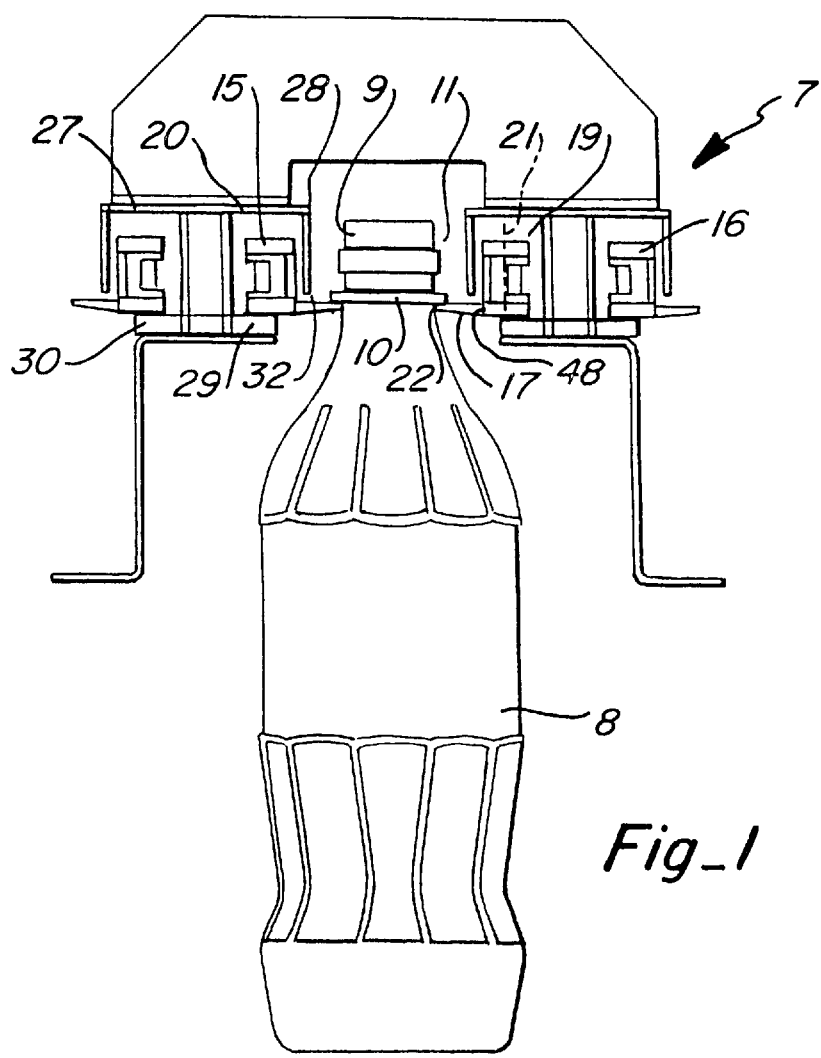
Fig_1
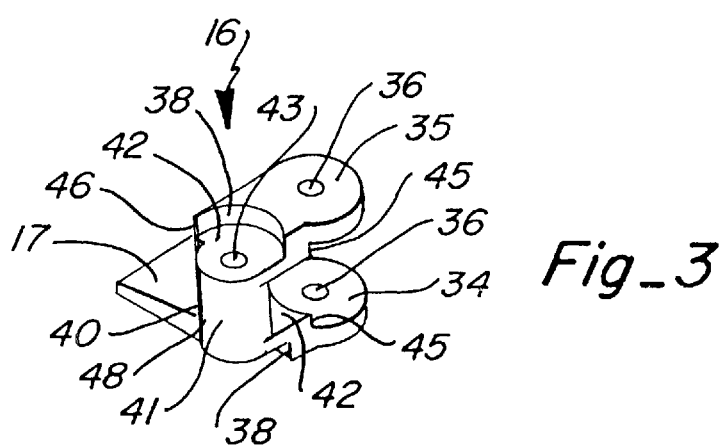
Fig_3

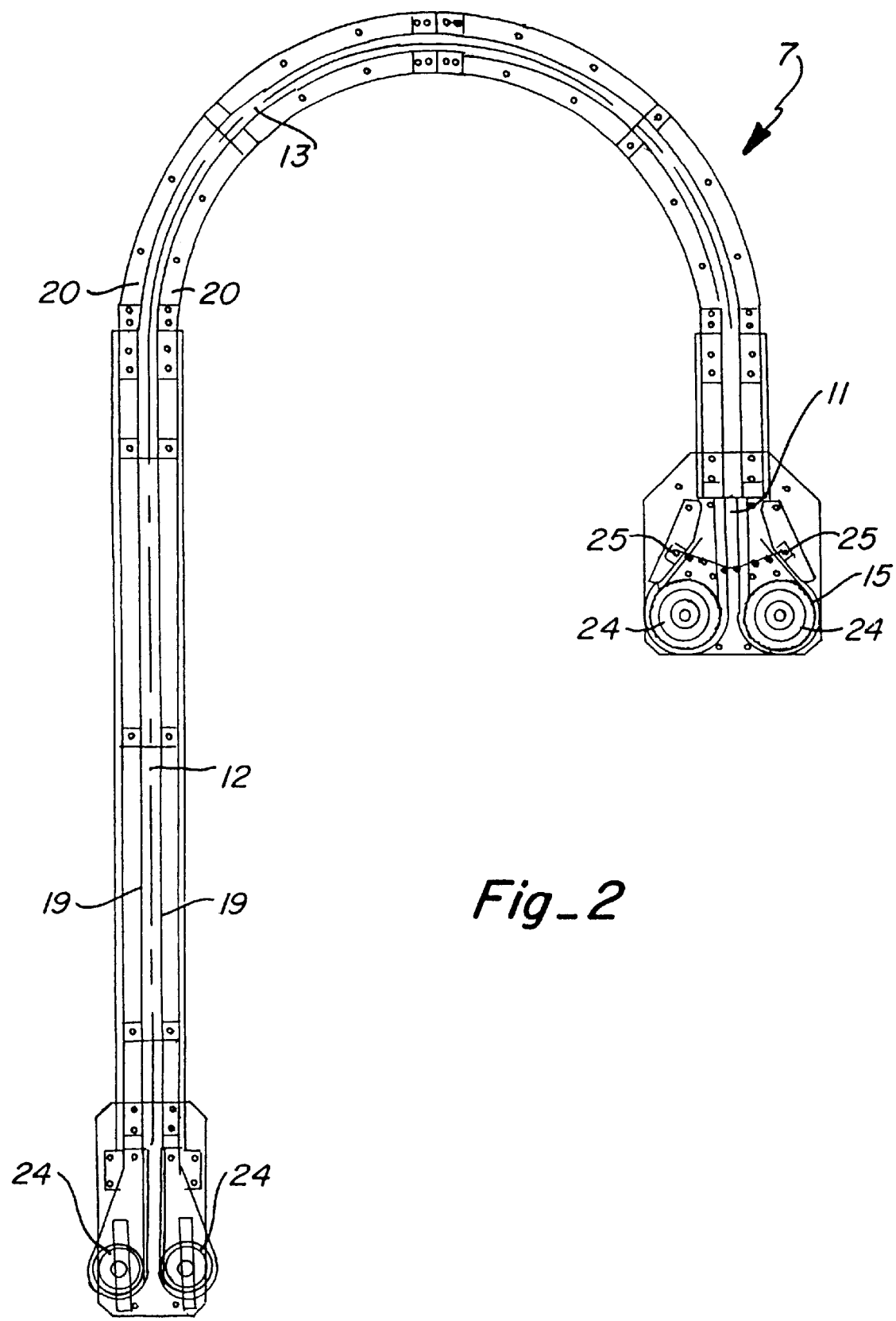
Fig_2

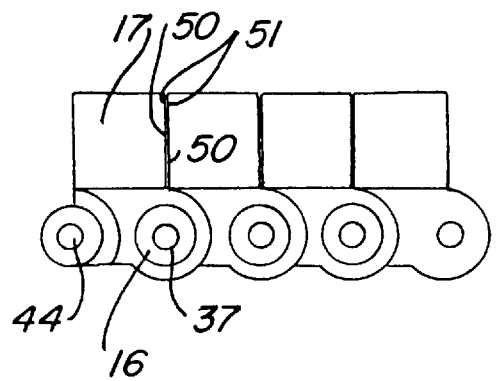
Fig_4
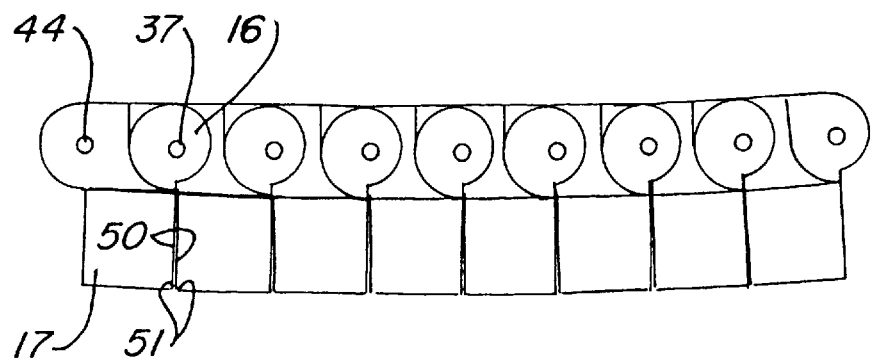
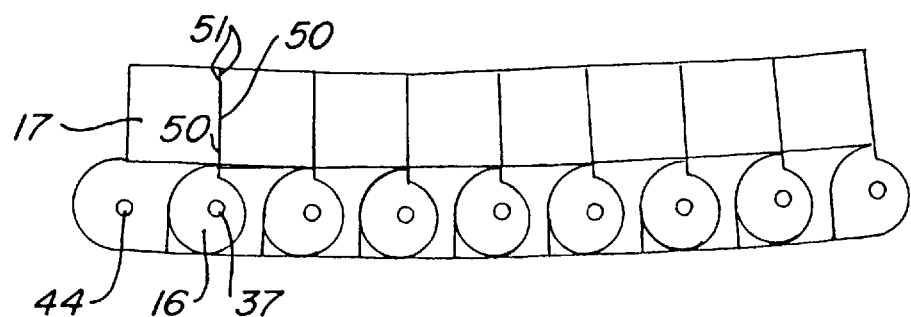
Fig_5

ARTICLE CONVEYANCE HAVING MECHANICAL DRIVE

RELATED APPLICATION

This application is a Division of U.S. patent application Ser. No. 09/419,342 filed Oct. 15, 1999 by Donald J. Simkowski and entitled "ARTICLE CONVEYANCE HAVING MECHANICAL DRIVE", now U.S. Pat. No. 6,279,729.

FIELD OF THE INVENTION

This invention relates to article conveyance, and, more particularly, relates to apparatus and method for article conveyance having mechanical drive for urging articles along a conveying path, and, still more particularly, relates to apparatus and method for mechanically conveying articles having a neck portion with a neck ring thereon.

BACKGROUND OF THE INVENTION

It is oftentimes necessary to convey articles, such as, for example, containers, between different locations, such as, again by way of example, moving bottles having a neck portion with a neck ring thereon, from one location, or position, to another in connection with manufacture, processing, storage, and/or filling of the bottles.

While articles may sometimes simply be moved in single line, or file, between locations, it is sometimes necessary, or at least preferable, that unstable articles such as containers having a neck portion with a neck ring thereon, be supported during conveyance by engaging members that engage the lower protruding edge of the neck ring, with the thus supported articles being moved along an article conveying path either by air urging the articles along the path with the articles sliding along fixed position engaging members, as shown for example, in U.S. Pat. No. 4,284,370 (Danler et al.) and U.S. Pat. No. 5,630,679 (Simkowski et al.), or by causing the engaging members to be moved along the article conveying path to thereby urge the articles along the article conveying path due to frictional engagement between the articles and the article engaging members, as shown for example, in U.S. Pat. No. 4,802,571 (Born et al.), U.S. Pat. No. 4,874,081 (Konko), U.S. Pat. No. 5,029,696 (Van Tilburg), U.S. Pat. No. 5,553,698 (Patois et al.), U.S. Pat. No. 5,937,998 (Priero), and U.S. Pat. No. 6,131,724 (Hirasawatu et al.).

Particular difficulty has heretofore been encountered, however, in handling some types of articles during conveyance, including, for example, unstable articles supported during conveyance by engagement with neck rings on the articles, and this invention is particularly directed to improvement of such conveyance.

SUMMARY OF THE INVENTION

This invention provides improved apparatus and method for article conveyance by providing better and/or more efficient article contact during conveyance and/or by providing greater conveyance flexibility, including the ability to provide deviations, or turns, in the conveying path.

It is therefore an object of this invention to provide improved article conveying apparatus and method.

It is another object of this invention to provide improved article conveying apparatus and method capable of better and/or more efficient article contact during conveyance.

It is another object of this invention to provide improved article conveying apparatus and method having improved conveyance flexibility, including enabling deviations, or turns, in the article conveying path.

It is another object of this invention to provide improved article conveying apparatus and method for apparatus that includes an elongated member with a plurality of sections each of which has an article engaging member extending into an article conveying path for engaging articles and urging engaged articles along the path.

It is another object of this invention to provide improved apparatus and method for apparatus that includes a chain having a plurality of shaped links and a flange extending therefrom for engaging articles to be conveyed along an article conveying path to urge movement of the articles along the article conveying path.

With these and other objects in view, which will become apparent to one skilled in the art as the description proceeds, this invention resides in the novel construction, combination, arrangement of parts, and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a simplified cut-away side view of apparatus for conveying articles according to this invention;

FIG. 2 is a top view of the apparatus illustrated in FIG. 1;

FIG. 3 is a perspective view of a link of the chain illustrated in FIG. 1;

FIG. 4 is a top view illustrating a plurality of connected adjacent links of chain, each as shown in FIG. 3, and also illustrating relative positioning of the flanges extending from adjacent links of a straight chain run; and FIG. 5 is a top view illustrating a plurality of connected adjacent links of chain, similar to that shown in FIG. 4, but illustrating relative positioning of the flanges during an angular deviation, or turn, in the chain run.

DESCRIPTION OF THE INVENTION

As shown in FIG. 1, apparatus 7, according to this invention, conveys articles 8, shown in FIG. 1 to be plastic bottles having a neck portion 9 with a protruding neck ring 10 thereon, along article conveying path 11. As indicated in FIG. 2, the articles may be conveyed along a straight path, or run, 12, but may also be conveyed along a path, or run 13 having an angular deviation, or turn, therein.

While the article conveying path is often near horizontal (with some deviation therefrom being meant to be included in the term "horizontal as used herein), it is sometimes necessary, or desirable, to convey the articles along an inclined and/or declined path (with an incline or decline of up to, or exceeding, about ten degrees having been found to be acceptable), and this invention is also meant to include such conveyance.

In addition, while articles 8 have been specifically illustrated in the drawings as bottles having a neck portion with a neck ring thereon, it is meant to be realized that other types of articles might also be conveyed by apparatus according to this invention, including, for example, other types of containers, so long as the articles to be conveyed are sufficiently light in weight and configured to be acted upon in the same manner as shown and described herein.

As best shown in FIGS. 1 and 2, apparatus 7 conveys articles 8 in single line, or file, between locations, as needed and/or desired, with the articles being mechanically urged, or driven, by an elongated member 15, illustrated in the drawings as a chain, having a plurality of sections 16, illustrated in the drawings as chain links.

Each section, or link, has an article engaging member 17, illustrated in the drawings as a flange, extending therefrom into article conveying path 11 to engage, or contact, articles 8 thereat and urge the articles along the article conveying path, due to frictional engagement between the articles and the article engaging element, or flange, upon movement of the elongated member, or chain, along a separate path 19 established by elongated member, or chain, guide 20, with such an arrangement also enabling accumulation of articles on the article conveying path where needed, or desired, without requiring termination or disruption of movement of the elongated member, or chain, along the elongated member, or chain, path.

As best illustrated in FIG. 1, and as is now common in conveying articles with a protruding neck ring, the article engaging members, or flanges, 17 engage the lower, or bottom, surface, or edge, 22 of the articles to effect urging of the articles along the article conveying path.

As best illustrated in FIGS. 1 and 2, and as is also now common in conveying articles, separate elongated member, or chain, paths 19 are normally established at opposite sides of article conveying path 11 with article engaging members, or flanges, 17 engaging opposite sides of the articles to urge the articles along article conveying path 11.

While not specifically shown herein, it is meant to be realized that some articles, or some specific applications, could utilize a single elongated member, or chain, driving article engaging members, or flanges, that engage only one side of the articles to be conveyed, with a ledge, or the like, being provided at the opposite side of the article. It is also meant to be realized that the elongated member might, for some applications, be other than a chain, and could be, for example, a belt, so long as the elongated article utilized is fully equivalent to a chain as specifically set forth in this specification.

As best illustrated in FIGS. 1 and 2, guides 20 (conventionally mounted on support structure, not shown) establish each elongated member, or chain, path 19, and each such path extends along article conveying path 11 (article conveying path 11 is actually established by the article engaging members, or flanges, 17) so that when the elongated member, or chain, path 19 extends horizontally, article conveying path 11 also extends horizontally but is horizontally offset from the elongated member, or chain path 19 whereby articles 8 conveyed along the article conveying path have a portion (neck portion 9 as illustrated in FIG. 1) that is adjacent to and horizontally offset from the elongated member, or chain, path.

The major axis 21 of each of sections, or links, 16 of the elongated members, or chain, extend in a direction normal (i.e., perpendicular) to the direction of elongated member, or chain, path 19. As illustrated in FIG. 1, when elongated member, or chain, path 19 is horizontal, then the major axis of sections, or links, 16 extends vertically. This positioning of chain 15 is shown in FIG. 1 to be effected by chain guide 20 with guide 20 substantially surrounding, or enclosing, chain 15.

As indicated in FIGS. 1 and 2, chain 15 is preferably an endless chain that extends around sprockets 24, may utilize chain tighteners, or positioners, 25, and may be conventionally driven by a motor (not shown) that rotates one or more sprockets to cause movement of the chain along the chain path. As indicated in FIGS. 1 and 2, separate endless chains are utilized at opposite sides of the article conveying path when urging movement of the articles along the article conveying path from both sides thereof.

Guide 20 is preferably formed as a two piece guide with upper portion 27 having side and top walls 28 (upper guide portion 27 may be an elongated U-shaped channel) and lower portion 29 having bottom wall 30 conventionally fastened to upper portion 27 using a bolt or the like.

Guide 20 has an elongated aperture, or opening, 32 provided at, or below, the lower portion of one side wall 28 that extends along the entire side wall to enable flanges 17 to extend from each link 16 of chain 15 into article conveying path 11.

As best shown in FIG. 3, each link 16 of chain 15 has a pair of end plates, or ears, 34 and 35 that extend in a plane parallel to the direction of chain movement (i.e., horizontal when the direction of chain movement is horizontal) with plates 34 and 35 being spaced from one another along the major axis of each link (i.e., vertically spaced when the direction of article movement is horizontal), with apertures 36 therein to receive linking pins 37 (as indicated in FIGS. 4 and 5) between end plates 34 and 35, and with plates 34 and 35 having contoured edge, or side, portions 38.

Each link 16 also has a body portion 40 that includes a cylindrical portion 41 that extends in a direction normal to the direction of chain path 19 (i.e., extends vertically when chain path 19 extends horizontally). End plates, or ears, 42 are at opposite ends of cylindrical portion 41 and extend in a plane normal to cylindrical portion 41 (i.e., are horizontally positioned when cylindrical portion 41 is vertically positioned), with cylindrical portion 41 and plates 42 having apertures 43 therethrough for receiving linking pin 44 (as indicated in FIGS. 4 and 5).

End plates 42 also extend under end plates 34 and 35 for connection to end plates 34 and 35 thereat, with end plates 42 having edge, or side, portions 45 (i.e., vertically extending when end plates 42 are horizontally positioned) that are offset from end plates 34 and 35, and each link also has a wall 46 that extends between end plates 34 and 35 and cylindrical portion 41 at the side of the link from which flange 17 extends for strengthening the link.

As best shown in FIGS. 1 and 3, flange 17 extends from lower end portion 48 (and therefore from end plate 34 and from the bottom of wall 46) of each link 16 in a direction normal to both chain path 19 and the major axis of link 16 (i.e., each flange 17 extends horizontally from each link 16 and from wall 46 when chain path 19 extends horizontally) to engage articles on article conveying path 11.

As indicated in FIGS. 4 and 5, when links 16 are connected, or joined, by linking pins 37 and 44, to form endless chain 15, adjacent links have the cylindrical portion of one link received between end plates 34 and 35 of an adjacent link with contoured, or shaped, side edges 38 of each of end plates 34 and 35 of adjacent links, as well as side edges 45 adjacent to cylindrical portion 41 of adjacent links, permitting rotation of each link with respect to each adjacent link in the chain.

With adjacent links joined to form an endless chain, flanges 17 of adjacent links extending into article conveying path 11 are contiguous to one another, as indicated in FIGS. 4 and 5, to virtually form a movable continuous support for engaging articles in the article conveying path and urge the articles along the path.

As indicated in FIG. 4, during a straight run 12 of the chain, flanges 17 extend substantially parallel with respect to one another into the article conveying path with substantially equal small spacing between adjacent edges 50 of each of the flanges.

As indicated in FIG. 5, angular deviations, or turns, in article conveying path 11 are enabled since adjacent links of the chain can be rotated with respect to one another to a degree sufficient to allow angular deviation of chain path 19. To effect such angular deviations, or turns, the walls of guide 20 are bent, or rotated, as necessary, including, if needed, notching the walls to achieve the needed path deviation.

As also indicated in FIG. 5, with dual chains utilized at opposite sides of an angular deviating path run 13 in the article conveying path, flanges 17 at one side of the article conveying path are angularly deviated, or rotated, in one direction so that adjacent flanges have an increased spacing at outer edges 51 of adjacent flange edges 50, while flanges 17 at the opposite side of the article conveying path are angularly deviated, or rotated, in the opposite direction so that adjacent flanges have a decreased spacing at outer edges 51 of adjacent flange edges 50.

In a working embodiment of this invention, it has been found that a spacing of about 0.020 inches when parallel with a maximum increase and/or decrease in spacing of about 0.010 inches for turns results in about a 24 inch turning radius.

It has also been found in a working embodiment of this invention that use of dissimilar material for the chain and chain guide is preferred, with use of dissimilar polymer materials being now preferred, including, for example, Acetal for the chain and oil impregnated ultra high molecular weight (UHMW) polymer for the chain guide.

As can be appreciated from the foregoing, this invention provides improved apparatus and method for efficiently conveying articles, such as, for example, containers such as bottles having a neck portion with a neck ring thereon.

What is claimed is:

1. A method for conveying articles, said method comprising:
   positioning an elongated member with a plurality of sections in a guide member defining a guide path capable of having angular deviation therealong;
   moving said elongated member in a first direction along said guide path while maintaining a major axis of the sections extending in a second direction essentially normal with respect to said first direction; and
   causing a plurality of article engaging members, connected with said sections of said elongated member and when in said guide member extending therefrom through an opening in said guide member in a third direction essentially normal with respect to both said guide path and said major axis of said sections, to engage articles at an article path established by said article engaging members and extending adjacent to and along said guide path in said first direction whereby the articles are urged along said article path by said movement of said elongated members along said guide path.

2. The method of claim 1 wherein said method includes providing a chain as said elongated member, providing a plurality of links of said chain as said plurality of sections of said elongated member, and providing a plurality of flanges as said plurality of article engaging members.

3. The method of claim 1 wherein said method includes providing a second elongated member with a second plurality of sections positioned in a second guide member defining a second guide path capable of having angular deviation therealong with said second guide member positioned at the side of said article path opposite to that of said elongated member, moving said second elongated member in a fourth direction along said second guide path while maintaining a major axis of said second sections extending in said second direction essentially normal to said fourth direction, and causing a second plurality of article engaging members, connected with said second sections of said second elongated members and when in said second guide member extending through an opening in said second guide member in a fifth direction essentially normal with respect to both said second guide path and said major axis of said second sections, to engage articles at said article path established by said article engaging members and said second article engaging members whereby the articles are urged along said article path by said movement of both said elongated member along said guide path and movement of said second elongated member along said second guide path.

4. The method of claim 3 wherein said method includes providing a chain as said elongated member, a plurality of links of said chain as said plurality of sections of said elongated member, a plurality of flanges as said plurality of article engaging members, a second chain as said second elongated member, a second plurality of links of said second chain as said second plurality of sections of said second elongated member, and a second plurality of flanges as said second plurality of article engaging members.

5. The method of claim 1 wherein the articles to be conveyed have neck portions with neck rings thereon, and wherein said method includes having said article engaging members engage said neck rings to establish said article path and to support the articles during conveyance along said article path.

6. A method for conveying articles, said method comprising:
   positioning an elongated member with a plurality of sections in a guide member having essentially parallel first and second walls;
   moving said elongated member in a first direction along said guide path while maintaining a major axis of the sections extending in a second direction essentially normal with respect to said first direction and with said first and second walls of said guide member spaced from one another in said second direction; and
   causing a plurality of article engaging members, connected with said sections of said elongated member and when in said guide member extending therefrom through an opening in said guide member in a third direction essentially normal with respect to both said guide path and said major axis of said sections, to engage articles at an article path established by said article engaging members and extending adjacent to and along said guide path in said first direction whereby the articles are urged along said article path by said movement of said elongated member along said guide path.

7. The method of claim 6 wherein said method includes providing a chain as said elongated member, providing a plurality of links of said chain as said plurality of sections of said elongated member, and providing a plurality of flanges as said plurality of article engaging members.

8. The method of claim 6 wherein said method includes providing a second elongated member with a second plurality of sections positioned in a second guide member defining a second guide path capable of having angular deviation therealong with said second guide member positioned at the side of said article path opposite to that of said elongated member, moving said second elongated member in a fourth direction along said second guide path while maintaining a major axis of said second sections extending in said second direction essentially normal to said fourth direction, and causing a second plurality of article engaging members, connected with said second sections of said second elongated members and when in said second guide member extending through an opening in said second guide member in a fifth direction essentially normal with respect to both said second guide path and said major axis of said second sections, to engage articles at said article path established by said article engaging members and said second article engaging members whereby the articles are urged along said article path by said movement of both said elongated member along said guide path and movement of said second elongated member along said second guide path.

9. The method of claim 8 wherein said method includes providing a chain as said elongated member, a plurality of links of said chain as said plurality of sections of said elongated member, a plurality of flanges as said plurality of article engaging members, a second chain as said second elongated member, a second plurality of links of said second chain as said second plurality of sections of said second elongated member, and a second plurality of flanges as said second plurality of article engaging members.

10. The method of claim 6 wherein the articles to be conveyed have neck portions with neck rings thereon, and wherein said method includes having said article engaging members engage said neck rings to establish said article path and to support the articles during conveyance along said article path.

* * * * *